3,519,557
CONTROLLED HYDROGENATION PROCESS
Carl E. Pruiss, Madison, Conn., assignor to Sun Oil Company, Philadelphia, Pa., a corporation of New Jersey
Continuation of application Ser. No. 632,973, Apr. 24, 1967. This application Aug. 15, 1969, Ser. No. 852,153
Int. Cl. C10g *23/02*
U.S. Cl. 208—143                                    11 Claims

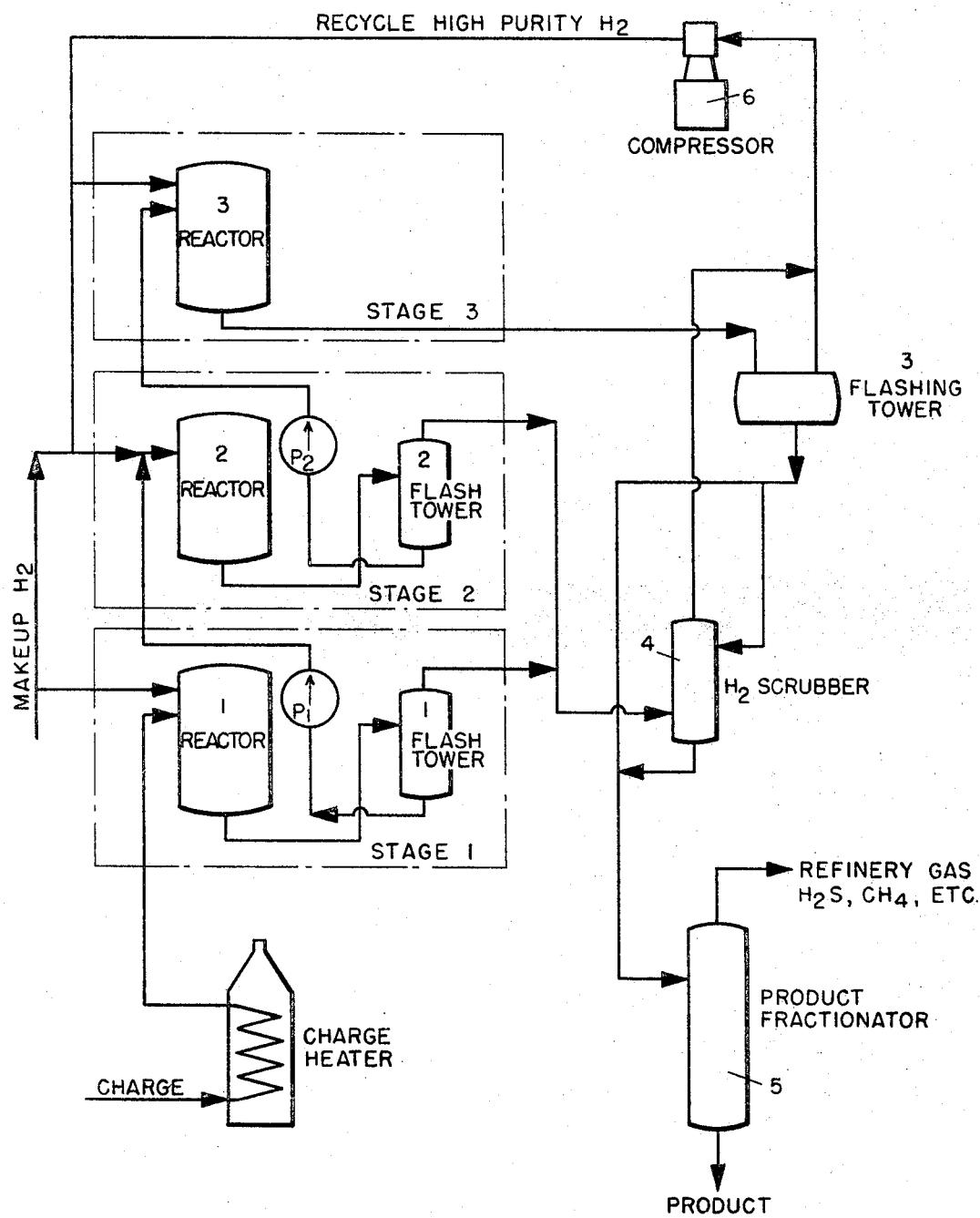

ABSTRACT OF THE DISCLOSURE

An improved process of hydrogenating petroleum fractions wherein the temperature and reaction are controlled by intermittently dissipating the exothermic heat of reaction before the temperature rises above a predetermined level by carrying out the hydrogenation in several and separate catalytic reaction stages and interposing therebetween a slight but rapid pressure reduction of about 50 p.s.i. whereby gaseous and very light materials such as $H_2S$, $CH_4$, and $CO_2$ are vaporized and removed.

---

This application is a continuation of Ser. No. 632,973 filed Apr. 24, 1967, and now abandoned.

This invention relates to improvements in liquid-phase hydrogenation, frequently called trickle-phase hydrogenation. Still more specifically, the invention relates to the control of the temperature during such process in a novel manner whereby improved quality and other advantages are obtained.

BACKGROUND OF THE INVENTION

Liquid-phase hydrogenations are carried out at relatively high pressures of a few hundred pounds to about 4000 pounds over a fixed-bed catalyst. Such processes invariably involve the occurrence of several competing reactions, all of which are temperature sensitive and make the obtainment of one or two preferentially to the others extremely difficult because of the difficulties of close temperature control. Generally, such hydrogenation reactions involve: (1) the saturation of double and/or triple bonds; (2) the removal of sulfur; (3) the removal of combined nitrogen; (4) cracking; and can involve (5) the removal of heavy metal contaminants. Reactions (1), (2), and (3) are exothermic, and the occurrence of one of these reactions tends to generate heat to the point of initiating more of these reactions upon the obtainment of the respective threshold of temperature for logarithmic acceleration of each of said reactions with still more heat released when such obtains. Furthermore, as the reaction proceeds, the hydrogen reactant is depleted, tending to cause a shift in the equilibrium and the promotion of certain of the reactions in preference to others. Still further, the formation of certain products of the hydrogenation, if they accumulate, shift the equilibrium so as to inhibit the occurrence of certain of the reactions that may be desired. A specific erample is the formation $H_2S$ which inhibits the removal of nitrogen. In practice, it is frequently found necessary, if not economically desirable, to employ impure hydrogen streams which may be referred to as refinery hydrogen streams in such processes. The impurities in such streams has the disadvantages of reducing the degree of hydrogen utilization and also the throughput of the reactor.

The prior art has sought to solve the primary problem of temperature rise three basic ways. These are (1) to introduce a cool quench oil into the reactor bed, or (2) to insert cooling coils within the reactor, or (3) to carry out the reaction in two stages with a heat exchange cooling stage in between said hydrogenation stages. These methods have only partially solved the many problems, and primarily, have only partially mitigated the temperature problem while leaving the other problems to remain or, in some cases, even in an aggravated condition in spite of the expense and effort. It is, therefore, highly desirous in many cases to obtain a method which more satisfactorily copes with the plurality of inter-related problems of liquid-phase hydrogenation reactions than those processes heretofore available.

It is a primary object of this invention to control the temperature of a liquid-phase hydrogenation reaction.

It is another object of this invention to reduce the occurrence of accumulation of by-products of the hydrogenation reaction within the reaction zone whereby certain desired reactions are not inhibited and still further, to reduce the amount of impurities in the reactor whereby throughput is increased when impure hydrogen streams are employed.

It is still a further object to improve the quality of the hydrogenated product as a consequence of more accurately controlling the temperature throughout such hydrogenation reactions.

To the accomplishment of the foregoing and related objects, the present invention comprises carrying out a liquid-phase hydrogenation process in a plurality of stages and wherein high temperature (i.e. operating temperatures) and relatively high pressure flashes or vaporization stages are carried out in between said hydrogenation stages whereby low boiling materials are removed and the temperautre of the reaction mixture is decreased. In more detail, the process comprises operating the flashing zone between the hydrogenation zones at a pressure not more than 100 pounds, usually and preferably not more than about 50 pounds, less than the pressure employed in the hydrogenation zones.

Before proceeding with a presentation of examples of the invention, it will be found most helpful to discuss certain aspects of the invention and the limits and relationship of the various process features.

The single figure is a diagrammatical flow sheet showing the major steps of the present invention. Minor conventional steps have been omitted for simplicity.

In a trickle-phase hydrogenation, the hydrocarbon feed is fed together with hydrogen to an adiabatic reactor. and there it trickles down over a fixed-catalyst bed.

The precise operating conditions that are employed in such hydrogenation reactions naturally are to a great extent dependent on the particular feed stock and consequently, the specific effect desired to be achieved on same. In general, however, the temperature range is about 550° to 800° F. and more usually about 600° to 700° F. and the pressure varies from about 400 p.s.i.g. to as high as about 4000 p.s.i.g., but more usually about 500 to 2000 p.s.i.g. Preferably, the pressure is in the range of about 500 to 750 p.s.i.g. In such cases, the pressure in the subsequent flashing towers is about 400 to 450 p.s.i.g. to 650 to 700 p.s.i.g.

The feed material can range from a typical light gasoline to heavy vacuum gas oils and even deasphalted oils. More specifically, but illustratively only, the feeds can be light cycle oil and No. 2 furnace oil. In general, the preferred ranges of temperature and pressure hereinabove are employed with the lower boiling feed materials. It is, of course, possible and even advantageous in some cases to operate the various stages at different conditions within the limits specified herein.

While any sulfactive hydrogenation catalyst may be employed, such as oxides and sulfides of chromium, molybdenum and tungsten, the well-known and commercially available and utilized cobalt-molybdenum oxides and nickel-molybdenum oxide which are usually converted to the sulfide catalyst are preferably employed. Of course, such catalyst may be employed with or without supports, such as alumina, and may be used with or without other activators.

Usually the total amount of hydrogen employed, including recycle hydrogen, is about 150 to 5000 standard cubic feet per barrel (s.c.f./bbl.) more usually about 400 to 1000 s.c.f./bbl. Those skilled in the art will have no difficulty in selecting the amount of hydrogen in a specific case based on the feed and specified effect to be accomplished since this is well-known to them.

It can be readily appreciated that the brief interruption of the hydrogenation reaction with a flashing unit, wherein the pressure is quickly reduced, will result in the evaporation of lower boiling materials and the liberation of gases, either formed by the hydrogenation reaction or present as impurities in the hydrogen feed. It is likewise apparent that when such gases are removed, there is a consequential reduction in temperature of the remaining liquid effluent by reason of the endothermic nature of such a phase change. Still further, it is apparent that there is a reduction in the volume of effluent to be passed to the next and subsequent hydrogenation zones or stages. Interestingly enough, the foregoing can be achieved by a relatively slight reducion in the pressure, rather than a total, or very large reduction in the pressure and even without the loss of the hydrogen, as might be expected. This is so because of hydrogen's unusual inverse solubility characteristic which results in considerable hydrogen remaining in the solution. These aspects are quite important, particularly from the viewpoint of a commercial operation. When the pressures are reduced more than about 100 p.s.i.g., it requires compressors, as such, to recompress the reactants to the higher pressures required in the following stage.

By contrast, my process, calling for only a relatively small drop in pressure, does not require the use of expensive compressors to return the pressure to its previous level, or even slightly higher should a slightly higher pressure be desired in the next hydrogenation zone. Such increases can be adequately obtained by such pumps as centrifugal, but reciprocating of screw pumps can also be used. Actually the subsequent hydrogenation zones can be suitably if not advantageously operated at the lower pressure so that repressuring is not always required and in fact may not be desired.

The number of reaction zones are not limited in theory, but, of course, practical considerations do limit the number of stages which can be employed. At least two zones are to be employed and as many as 4 zones can be employed. Usually and preferably, 2 to 3 zones are employed to accomplish the objects of this invention.

ILLUSTRATIVE EXAMPLE

Referring now to the figure a charge of #2 furnace oil boiling between about 205° and 625° F. is heated to about 525° F. and is charged at a rate of about 14,000 bbl./day to the top of reactor 1 of stage 1 having a catalyst volume of about 300 ft.$^3$ and is hydrotreated over the cobalt-molybdenum sulfide catalyst by initiating the hydrogenation at about 540° F. and 575 p.s.i.g using about 500 s.c.f. of hydrogen per barrel of oil. The effluent of reactor 1 is charged to flash tower 1 where the pressure is reduced suddenly by about 75 p.s.i.g. which causes very light materials to vaporize and the temperature of the liquids to be 540° F. The vaporized light materials and the other gases are then taken overhead to a hydrogen scrubber 4. The liquids with dissolved hydrogen and other gases are passed to pump 1 where they are repressured to about 575 p.s.i.g. and charged with make-up hydrogen to Stage 2. In Stage 2 the same procedure as in Stage 1 is repeated, then the liquids from Stage 2 are charged with make-up hydrogen to Stage 3 which (as shown in the figure) consists only of a reactor, but which is operated like reactors 1 and 2. The effluent from Stage 3 is sent to flashing tower 3 operated in this case of a furnace oil feed at about 540° F. and about 530 p.s.i.g. The temperature being adjusted in all cases to avoid the oil becoming too viscous depending on the feed oil charged. Hydrogen from this flash tower and from the hydrogen scrubber 4 are returned to reactors 2 and 3 by means of compressor 6. The liquids from flashing tower 3 and from the hydrogen scrubber pass to a product fractionator 5 where liquid product is separated from refinery gases, such as $H_2S$, $CH_4$, $CO_2$, etc. The product is fractioned to remove as much light or heavy ends as desired in conventional fashion.

One important feature with regard to the flash towers operated in between the hydrogenation zones is that it is important to keep the vapor to liquid molar ratio in the flash tower scrubber above about .02, if the amount of hydrogen loss to refinery gas is to be kept below 20%. On the other hand, the vapor to liquid molar ratio in the scrubber tower must be kept below about 0.10 to insure that the impurities ($CH_4$, $H_2S$, $CO_2$,$N_2$, etc.) are kept in the feed to the product fractionator and not permitted to be recycled to he hydrogen compressor and thereby lower the recycle hydrogen purity. This is easily controlled as shown in the accompanying figure by diverting a sufficient quantity of low pressure flash oil to the scrubber tower through line 8 and diverting the rest to the product fractionator.

The invention claimed is:
1. A process for hydrogenation of petroleum fractions which comprises subjecting a petroleum fraction to hydrogenation in a plurality of stages over a sulfactive hydrogenation catalyst at 550° to 800° F. and 400 to 4000 p.s.i.g., flashing the products from the first stage by reducing the pressure thereon by about 50 to 100 p.s.i.g. to vaporize lower boiling materials and liberate gases from said products and reduce the temperature of the remaining liquid portion of said products, and subsequently hydrogenating all of said liquid portion of said products in a second stage, thereby to control the temperature of the hydrogenation and reduce the accumulation of by-products of the hydrogenation reaction in the hydrogenation zone.

2. Process according to claim 1 wherein said liquid portion is repressured prior to the second stage.

3. Process according to claim 1 wherein additional hydrogen is employed in the second stage.

4. Process according to claim 3 wherein the temperature is 600° to 700° F.

5. Process according to claim 4 wherein the pressure is 500 to 2000 p.s.i.

6. Process according to claim 5 wherein the pressure is 500 to 750 p.s.i.

7. Process according to claim 6 wherein there are two to four hydrogenation stages in series, and the products from each stage except the last are flashed and substantially all of the liquid residue from each flash is hydrogenated in the next stage in the series.

8. Process according to claim 7 wherein the catalyst is a combination of molybdenum sulfide with cobalt sulfide or nickel sulfide.

9. Process according to claim 8 wherein the reduction in pressure is about 50 p.s.i.

10. Process according to claim 9 wherein the boiling range of said fraction is from light gasoline to heavy vacuum gas oil.

11. Process according to claim 10 wherein said fraction is a number two furnace oil.

References Cited
UNITED STATES PATENTS

| | | | |
|---|---|---|---|
| 2,567,252 | 9/1951 | Strang | 208—212 |
| 2,952,625 | 9/1960 | Kelly et al. | 208—210 |
| 3,050,459 | 8/1962 | Schuman | 208—210 |
| 3,179,586 | 4/1965 | Honerkamp | 208—210 |
| 3,341,613 | 9/1967 | Hann | 208—143 |
| 3,349,027 | 9/1967 | Carr et al. | 208—210 |
| 3,362,901 | 1/1968 | Szepe | 208—210 |
| 3,367,860 | 2/1968 | Barnes et al. | 208—210 |
| 3,239,454 | 3/1966 | Streed et al. | 208—210 |
| 3,382,168 | 5/1968 | Wood et al. | 208—211 |

DELBERT E. GANTZ, Primary Examiner

G. J. CRASANAKIS, Assistant Examiner

U.S. Cl. X.R.

208—210, 216